Aug. 31, 1954     G. FLYNN, JR     2,687,931
CONNECTING ROD AND PISTON ASSEMBLY
Filed May 1, 1952
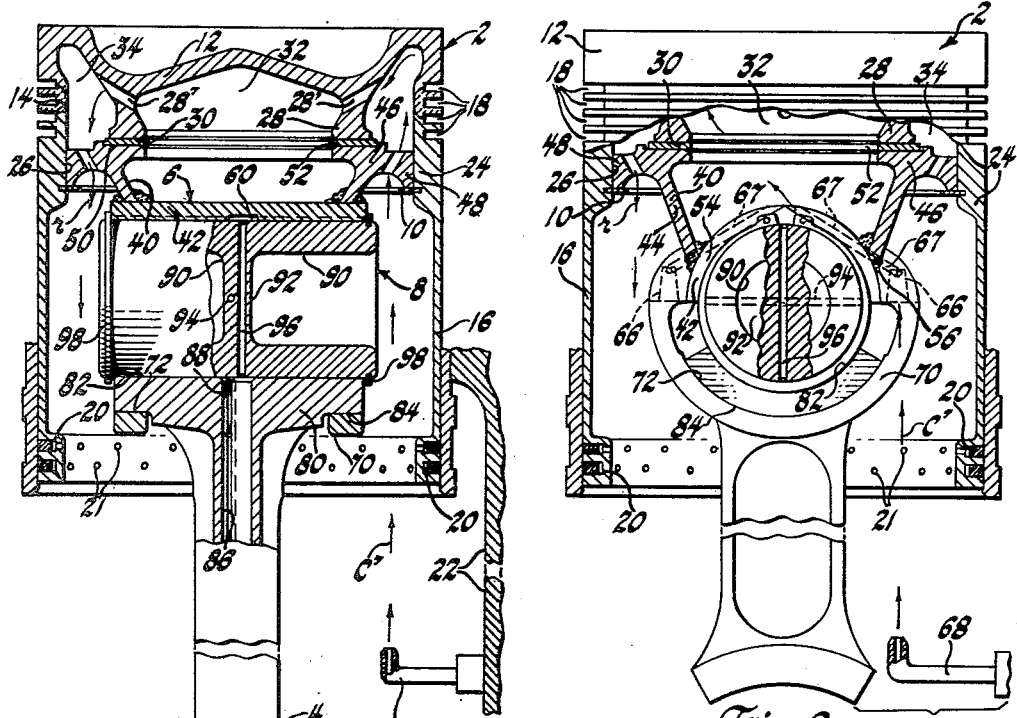
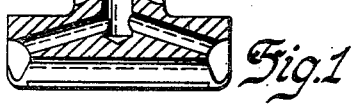
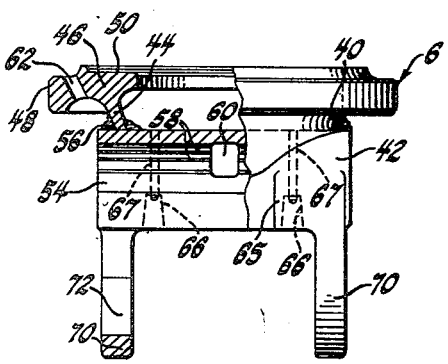
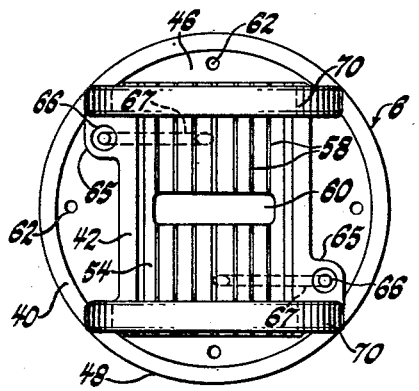
Inventor
Gregory Flynn Jr.
By
Willits, Helmig & Baillio
Attorneys Patented Aug. 31, 1954

2,687,931

UNITED STATES PATENT OFFICE 2,687,931

CONNECTING ROD AND PISTON ASSEMBLY

Gregory Flynn, Jr., Detroit, Mich., assignor to General Motors Corporation, Detroit, Mich., a corporation of Delaware Application May 1, 1952, Serial No. 285,399

10 Claims. (Cl. 309—19)

This invention relates to internal combustion engines of the two-cycle type and particularly piston and connecting rod assemblies therefor.

Among the principal objects of the invention are to provide an improved construction for a two-cycle engine piston and connecting rod assembly which (1) is extremely light in weight, (2) constitutes relatively few component parts designed to be held together in assembly without the use of bolts or other threaded fastening means, (3) provides means for introducing cooling oil into contact with the underside of the piston head from cooling oil jets located below the piston, (4) enables "full floating" of the piston about its longitudinal axis relative to the connecting rod, (5) permits the use of relatively thin piston side walls adapted to conform to the cylinder bore in which the piston operates, and (6) enables the use of a floating wrist pin of large bearing area.

In its essential form, these objects are attained by a piston having a head with a depending hollow cylindrical skirt, in which internal bearing surfaces are provided on the head and skirt for journably supporting a carrier member having a downwardly presenting slipper bearing portion which cooperates with an upwardly presenting slipper bearing portion on the connecting rod to form a journal for the wrist pin, the connecting rod being retained on the wrist pin by spaced apart straps or cradle portions depending from the carrier slipper portion and journalling on the cylindrical outer periphery of the connecting rod slipper portion, and the carrier member being retained in journalled relation with the piston by a suitable snap ring means located above the wrist pin.

A better understanding of these constructional features will be had from the following description in which reference is made to the attached drawing wherein:

Figure 1 is an assembly view of our improved piston and connecting rod, shown partly in elevation and partly in longitudinal section, means being shown diagrammatically associated therewith for directing a stream of cooling oil or other fluid upwardly into the interior of the piston skirt during operation.

Figure 2 is a view similar to Figure 1, but taken in section substantially at right angles to that of Figure 1, and diagrammatically showing additional means for directing a stream of coolant into the piston during operation.

Figure 3 is a view partly in elevation and partly in section of the carrier member, shown removed from the assembly.

Figure 4 is a bottom plan view of the carrier member as shown in Figure 2.

Referring now to the drawings in detail, the numeral 2 designates the piston, 4 the connecting rod, 6 the carrier member, 8 the wrist pin, and 10 indicates means in the form of a snap ring for retaining the carrier member and piston in assembled relation.

As shown, the piston has a crown portion or head 12 which may be of dished configuration and formed as a separate forging which is subsequently welded or otherwise bonded as at 14 to the upper end of the piston skirt 16. One or more grooves 18 for receiving compression rings and similar grooves 20 for oil rings are shown in conventional manner adjacent the upper and lower ends of the piston skirt respectively, and opposite the respective oil ring grooves 20 the skirt may be provided with a series of circumferentially spaced small apertures 21 through which oil collected from the side walls of the cylinder 22 may drain into the interior of the piston skirt. The wall of the piston skirt has a thickened section 24 located preferably immediately below the grooves 18 whose internal periphery forms a cylindrical annular bearing surface 26, and the piston head 12 is provided with a depending annular rib 28 terminating in a transversely disposed annular bearing seat 30. The rib 28, it will be noted, partitions the upper interior portion of the piston into a central chamber 32 and an outer annular chamber 34. The cylindrical bearing surface 26 on the piston skirt is relieved adjacent its lower end by an inwardly presenting annular groove which receives the snap ring 10. Between this groove and the section of the oil ring grooves 20, the side walls of the piston skirt are made relatively thin and extend continuously about the longitudinal axis of the piston.

The carrier member 6 may be made in one or more parts, and as shown, consists of an upper part and a lower part 42. The upper part includes a frusto-conical section 44 terminating at its upper end with a flange portion 46 whose outer periphery 48 makes a close journalled fit with the cylindrical bearing surface 26 of the piston. The upper face of the flange portion 46 is provided with an annular transverse bearing seat 50 which is slightly recessed below the upper face of the flange, as shown, to receive a thrust washer 52 of bronze or other good anti-friction quality material which serves as a thrust bearing between the carrier member and the piston. The lower end of the frusto-conical portion is suitably notched to receive the part-cylindrical slipper portion 54 of the lower part 42, the two parts being secured together as by welding at 56. The internal bearing surface of the slipper portion may be provided with suitable oil distribution grooves 58 extending longitudinally thereof from a circumferentially elongated central oil receiving recess 60, and the surface of the bearing may be coated with silver or other suitable material.

The flange 46 extends laterally beyond the transverse limits of the lower part 42, as shown, and is provided with a plurality of circumferentially spaced openings 62 which extend generally longitudinally of the axis of the piston. These openings 62 serve to provide communication between the annular outer chamber 34 of the piston above the flange 46 and the interior of the piston below this flange. As shown in Figure 1, one of these openings 62 is arranged opposite a cooling oil jet pipe 64, suitably mounted from the cylinder 22 or other stationary part of the engine which serves to direct a stream of cooling oil (indicated by arrows c) into the chamber 34 for cooling the adjacent underside of the piston head 12 during engine operation. One or more of such jet pipes 64 may be arranged in cooperation with others of the holes 62, the remainder of which holes serve to drain oil (as indicated by arrows r) from the chamber 34 back to the engine crankcase (not shown) below the piston. Communication between the piston outer chamber 34 and the central chamber 32 thereof is provided by generally radially extending openings 28' provided in the depending walls of the piston rib 28.

Depending from the opposite ends of the slipper portion 54 of the carrier member are a pair of cradle members in the form of upwardly presenting U-shaped straps 70 each having a part-cylindrical internal bearing surface 72 of larger diameter than and concentric with the internal bearing surface of the slipper portion 54. These straps 70 may be formed either integral (as shown) with the slipper portion 54 or may be removably secured thereto in any desired manner.

As shown, the connecting rod 4 terminates within the interior of the piston skirt with a T-shaped end 80 forming an upwardly presenting slipper bearing portion having a part-cylindrical internal bearing surface 82 in opposing relation to that of the carrier member slipper portion 54. Concentric with its internal bearing surface 82 the respective opposite ends of connecting rod slipper portion are provided with external cylindrical bearing surfaces 84 having a journalled fit with the bearing surfaces 72 provided on the straps. The shank of the connecting rod is shown suitably rifle drilled to provide a longitudinally extending lubricating oil passage 86 for conducting oil from the lower end of the rod to a central recess 88 on the internal bearing surface 82, from which recess the oil may travel longitudinally of the slipper portion by grooves formed in the surface 82 similar to the grooves 58 of the carrier member.

Journalled between the internal bearing surfaces 54 and 82 of the carrier member and connecting rod respectively is the wrist pin 8, which, for lightness of construction, is preferably formed with hollow end cavities 90 separated by a central partition 92. Transmission of lubricating oil between the connecting rod recess 88 and the corresponding recess 60 of the carrier member is provided by transversely extending oil passages 94 and 96 in the partition 92.

The slipper portion 54 of the carrier member is provided on one or both sides with a laterally extending boss 65 in which is provided a downwardly open recess 66, whose upper end connects with a drilled passage 67 extending transversely and upwardly through the wall of the slipper portion to the interior of the frusto-conical portion 44. One or both of these recesses 66 serves to receive a stream of oil (indicated by arrows c') from a second cooling oil jet 68, similarly mounted to the cylinder 22 or other stationary part of the engine. Cooling oil entering the recess 66 thus is conducted via its connecting passage 67 and directed upwardly into the central chamber 32 of the piston where it impinges on the underside of the piston head 12 and cools the same during engine operation.

The wrist pin 8 is retained endwise relative to the carrier member and connecting rod slipper portions 54 and 80 by means of conventional inspringing snap rings 98 engaging suitable external grooves in the outer periphery of the pin.

In assembling the parts, the connecting rod is cocked sufficiently to insert its T-shaped end 80 between the straps 70 and slipper portion 54 of the carrier member, after which the wrist pin is inserted between the slipper portions and anchored longitudinally thereof by the retainer rings 98. The pre-assembled rod, pin and carrier is then inserted as a unit into the piston skirt with the thrust washer 52 disposed between the bearing surfaces 26 and 50, after which the snap ring 10 is installed to complete the assembly.

I claim:

1. In a piston and connecting rod assembly, a piston having a head and a depending hollow skirt, a connecting rod terminating below said head with a slipper bearing portion having concentric internal and external bearing surfaces, a piston carrier having a support portion journalled for rotation about the longitudinal axis of the piston by said skirt and by the under side of said head and having a slipper bearing portion rigidly associated with said support portion and in oppositely presenting relation with said slipper bearing portion of the connecting rod, a wrist pin between and journalled by said slipper bearing portions, said carrier having two part-cylindrical cradle portions depending from its said slipper bearing portion and journalled by said external bearing surfaces of the connecting rod, said cradle portions being spaced apart longitudinally of the wrist pin to permit said connecting rod slipper bearing portion being inserted therebetween in position opposite said cradle slipper bearing portion prior to installation of said wrist pin, and means interengaging said skirt and carrier for retaining said support in journalled engagement with the underside of said head.

2. In a piston and connecting rod assembly, a piston having a head, a skirt depending from the outer marginal extremities of the head and an annular rib depending from the head within and concentric with the skirt, a carrier member within the piston having a piston supporting upper portion having frusto-conical shaped side walls terminating upwardly in a flange journalling on the internal periphery of the skirt and thrustably bearing against said rib, a connecting rod, and a wrist pin between said connecting rod and carrier member, said connecting rod and carrier member having oppositely presenting slipper portions journalling on the wrist pin, and a pair of upwardly presenting U-shaped straps depending from said carrier member slipper portion, said connecting rod slipper portion having external bearing surfaces adjacent its respective ends journalled on the inner peripheries of said U-shaped straps.

3. In a boltless full floating piston, floating wrist pin and connecting rod assembly, a hollow cylindrical piston open at one end and provided interiorly adjacent the other end with coaxial annular transverse and cylindrical bearing surfaces, a carrier member having a piston supporting upper portion with annular external and end bearing surfaces rotatively engaging said piston bearing surfaces and a wrist pin and connecting rod supporting lower portion, said lower portion including a slipper part having a downwardly presenting cylindrical internal bearing surface extending transversely of the piston with members depending from opposite ends of said slipper part forming upwardly presenting cylindrical internal bearing surfaces, a connecting rod having a slipper shaped end provided with an upwardly presenting cylindrical internal bearing surface and downwardly presenting external bearing surfaces journalled by the respective internal bearing surfaces of said depending members, a wrist pin journalled by the said downwardly presenting internal bearing surface of said slipper part and the said upwardly presenting internal bearing surface of said connecting rod, said piston having an annular internal groove intermediate its said cylindrical bearing surface and said wrist pin, and an outwardly expanding snap ring engaging said groove and retaining said carrier member engaged with said piston transverse bearing surface.

4. In combination, a hollow cylindrical piston open at one end, a connecting rod terminating in a T-shaped end within the piston, and means connecting the piston to said T-end including a wrist pin and a carrier member, said T-end and said carrier member having oppositely presenting part-cylindrical bearing surfaces in journalled engagement with said wrist pin and other concentric larger diameter bearing surfaces in journalled engagement with each other, said carrier member having annular thrust and radial bearing surfaces rotatively engaging the underside of the piston head and the internal side walls of the piston respectively, said thrust and radial bearing surfaces being located inwardly of the piston from said wrist pin.

5. In a piston and connecting rod assembly, a cylindrical piston having a head and a depending hollow skirt, said head having an annular boss depending within the skirt and partitioning the upper interior of the piston into inner and outer chambers, said boss having apertures in its depending walls providing communication between said chambers, a downwardly presenting thrust bearing surface on said boss, a piston carrier having an upwardly open annular portion rotatably bearing on said boss surface and provided radially outwardly of said surface with a flange journalling on the internal periphery of the skirt, said flange having passages extending upwardly therethrough connecting the outer of said chambers with the interior of the piston below said flange, said carrier having a lower portion including a downwardly presenting internal slipper bearing surface and spaced apart depending straps having internal cylindrical bearing surfaces concentric with and in oppositely presenting relation to said slipper bearing surface, a connecting rod having a transversely elongated slipper end received within said skirt and provided with an internal bearing surface disposed opposite said slipper bearing surface and external bearing surfaces journalled by said strap bearing surfaces, a wrist pin journalled by said carrier and connecting rod internal bearing surfaces, a ring removably engaging the internal wall of the skirt and holding said flange in engagement with said thrust bearing surface, said carrier lower portion having a downwardly open recess adjacent said wrist pin and a passageway connecting said recess to the interior of said annular portion below said inner chamber.

6. In a piston and connecting rod assembly, a piston having a head and a depending hollow skirt, a connecting rod having a T-shaped end connected to the piston, the transverse member of the T forming a slipper bearing of part-cylindrical form with concentric internal and external bearing surfaces, a wrist pin journalled by said internal bearing surface, and a carrier member journalled for rotation about the axis of the piston by said head and skirt and about the axis of said wrist pin by said wrist pin and connecting rod, the journalled relation between said carrier and connecting rod being effected by a pair of spaced-apart straps depending from the carrier member below said transverse member and having internal cylindrical bearing surfaces fitting said external bearing surfaces.

7. In a piston and connecting rod assembly, a wrist pin, a connecting rod and a carrier member, said wrist pin having a connection between said carrier member and connecting rod, said connection including oppositely presenting bearing surfaces on said carrier member and connecting rod and correspondingly presenting bearing surfaces on said carrier member and connecting rod, said oppositely presenting bearing surfaces being in journalled engagement with said wrist pin, and said correspondingly presenting bearing surfaces being in journalled engagement with each other.

8. In a piston and connecting rod assembly, a wrist pin, a connecting rod and a carrier member, said carrier member and connecting rod having oppositely presenting slipper portions journalling said wrist pin therebetween and correspondingly presenting bearing surfaces in journalled relation with each other.

9. In a piston and connecting rod assembly, a wrist pin, a connecting rod having a slipper bearing portion journalling on the wrist pin, and a carrier member having a slipper bearing portion journalled on the wrist pin in oppositely presenting relation to said connecting portion and another bearing portion journalled on the connecting rod and retaining the carrier member and connecting rod in journalled engagement with the wrist pin.

10. In a piston and connecting rod assembly, a piston having a head and a skirt depending from the head, a wrist pin of less length than the internal transverse dimension of said skirt, a carrier member and a connecting rod journalled on the wrist pin, means interconnecting said carrier member and connecting rod and accommodating their relative rotation about the wrist pin, said carrier member having respective bearing surfaces rotatably abutting the piston head and journalling the interior periphery of the piston skirt between the piston head and the wrist pin, and means rotatably retaining the carrier member within the piston including a member removably interengaged with the piston skirt inwardly of the piston from the wrist pin.

References Cited in the file of this patent

UNITED STATES PATENTS

| Number | Name | Date |
|---|---|---|
| 1,801,517 | Matthews | Apr. 21, 1931 |
| 1,830,847 | Matta | Nov. 10, 1931 |
| 1,898,169 | Bovard | Feb. 21, 1933 |
| 2,372,050 | Barraja-Frauenfelder et al. | Mar. 20, 1945 |
| 2,379,359 | Kettering | June 26, 1945 |

FOREIGN PATENTS

| Number | Country | Date |
|---|---|---|
| 277,759 | Great Britain | Sept. 26, 1927 |